United States Patent
Guo et al.

(10) Patent No.: US 11,790,685 B2
(45) Date of Patent: Oct. 17, 2023

(54) FINGERPRINT IDENTIFICATION STRUCTURE AND DISPLAY DEVICE

(71) Applicant: BOE TECHNOLOGY GROUP CO., LTD., Beijing (CN)

(72) Inventors: Yuzhen Guo, Beijing (CN); Yingming Liu, Beijing (CN); Haisheng Wang, Beijing (CN); Xiufeng Li, Beijing (CN); Peixiao Li, Beijing (CN); Yanling Han, Beijing (CN); Chenyang Zhang, Beijing (CN); Lijun Zhao, Beijing (CN); Yaqian Ji, Beijing (CN); Xue Dong, Beijing (CN); Xiaochuan Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 461 days.

(21) Appl. No.: 17/050,193

(22) PCT Filed: Nov. 21, 2019

(86) PCT No.: PCT/CN2019/119950
§ 371 (c)(1),
(2) Date: Oct. 23, 2020

(87) PCT Pub. No.: WO2021/097752
PCT Pub. Date: May 27, 2021

(65) Prior Publication Data
US 2023/0154228 A1  May 18, 2023

(51) Int. Cl.
*G06K 9/20* (2006.01)
*G06V 40/13* (2022.01)
(Continued)

(52) U.S. Cl.
CPC .......... *G06V 40/1306* (2022.01); *G06F 21/32* (2013.01); *G10K 11/30* (2013.01)

(58) Field of Classification Search
CPC ............................ G06V 40/1306; G10K 11/30
See application file for complete search history.

(56) References Cited

U.S. PATENT DOCUMENTS 4,131,021 A * 12/1978 Mezrich .................. A61B 8/00
73/625
9,824,254 B1 * 11/2017 Yazdandoost ...... G06V 40/1306
(Continued)

FOREIGN PATENT DOCUMENTS

| CN | 106782085 A | 5/2017 |
| CN | 107194327 A | 9/2017 |

(Continued)

OTHER PUBLICATIONS

Lin et al., "A collimated focused ultrasound beam of high acoustic transmission and minimum diffraction achieved by using a lens with subwavelength structures", Appl. Phys. Lett. 107, 113505 (2015); https://doi.org/10.1063/1.4931139; Pub Sep. 16, 2015, cover page and pp. 113505-1 through 113505-4. (Year: 2015).*

*Primary Examiner* — Brian Werner
(74) *Attorney, Agent, or Firm* — Nath, Goldberg & Meyer; Joshua B. Goldberg

(57) ABSTRACT

The present disclosure provides a fingerprint identification structure and a display device. The fingerprint identification structure includes an acoustic wave emitter, a focus acoustic lens, and a sound wave receiver. The acoustic lens are between the acoustic wave emitter and the sound wave receiver, the acoustic wave emitter is at a focal position of the acoustic lens and configured to emit acoustic wave toward the acoustic lens, the acoustic wave receiver is configured to detect the intensity distribution of the acoustic wave emitted by the acoustic wave emitter after the acoustic wave sequentially passes through the acoustic lens and the acoustic wave receiver, reaches the surface of the finger and (Continued)

is reflected back by the surface of the finger. The fingerprint recognition structure improves design flexibility.

14 Claims, 2 Drawing Sheets

(51) Int. Cl.
*G06F 21/32* (2013.01)
*G10K 11/30* (2006.01)

(56) References Cited

U.S. PATENT DOCUMENTS

| | | | |
|---|---|---|---|
| 2005/0163353 A1* | 7/2005 | Schneider | G06V 40/1306 |
| | | | 382/124 |
| 2007/0272020 A1 | 11/2007 | Schneider et al. | |
| 2008/0175450 A1* | 7/2008 | Scott | G06V 40/1306 |
| | | | 382/124 |
| 2019/0251320 A1* | 8/2019 | Kim | G06V 40/1306 |

FOREIGN PATENT DOCUMENTS

| | | |
|---|---|---|
| CN | 108073919 A | 5/2018 |
| CN | 109241891 A | 1/2019 |
| CN | 109614963 A | 4/2019 |

* cited by examiner

FINGERPRINT IDENTIFICATION STRUCTURE AND DISPLAY DEVICE

CROSS-REFERENCE TO RELATED APPLICATIONS

This is a National Phase Application filed under 35 U.S.C. 371 as a national stage of PCT/CN2019/119950, filed on Nov. 21, 2019, the entirety of which is hereby incorporated by reference.

TECHNICAL FIELD

The present disclosure relates to the field of fingerprint identification and display technologies, and in particular, to a fingerprint identification structure and a display device.

BACKGROUND

The existing under screen-based fingerprint identification solution is usually an acoustic wave-based fingerprint identification solution. Specifically, a layer of fingerprint identification device is attached to the backside of the display screen. The fingerprint identification device is composed of three stacked layers, i.e., an electrode array, a piezoelectric material layer and a common electrode. The emission and the reception of the acoustic wave are implemented by the three layers. More new types of acoustic wave-based and under screen-based fingerprint identification solutions are needed.

SUMMARY

The present disclosure provides a fingerprint recognition structure and a display device, to provide a new type of under-screen fingerprint recognition solution.

According to a first aspect of the present disclosure, there is provided a fingerprint identification structure including: an acoustic lens configured to reduce a divergence angle of acoustic waves; an acoustic wave emitter at a focal position of the acoustic lens and configured to emit acoustic waves toward the acoustic lens; and an acoustic wave receiver on a side of the acoustic lens away from the acoustic wave emitter and configured to receive acoustic waves reflected by a surface of a finger.

In some embodiments, the acoustic wave emitter is a point acoustic source.

In some embodiments, the point acoustic source includes a third electrode, a second piezoelectric material layer, and a fourth electrode sequentially stacked in a direction away from the acoustic lens.

In some embodiments, a material of the second piezoelectric material layer is a lead zirconate titanate piezoelectric ceramic.

In some embodiments, a ratio of a maximum dimension of the second piezoelectric material layer in an extension direction of a plane in which the second piezoelectric material layer is located to a focal length of the acoustic lens is less than or equal to 0.3.

In some embodiments, the acoustic wave receiver includes a first electrode, a first piezoelectric material layer, and a second electrode sequentially stacked in a direction toward the acoustic lens.

In some embodiments, the first electrode includes a plurality of first electrode units arranged in an array; and/or the second electrode includes a plurality of second electrode units arranged in an array; and the first piezoelectric material layer has a planar structure.

In some embodiments, a material of the first piezoelectric material layer includes polyvinylidene fluoride.

In some embodiments, the acoustic lens includes a lens body and a filing medium on a side of the lens body facing the acoustic wave emitter, and a surface of the lens body on a side of the lens body away from the filing medium is a flat surface.

In some embodiments, the second electrode is adhered to a surface of the lens body on a side of the lens body away from the acoustic wave emitter through a first adhesive.

In some embodiments, an acoustic impedance of the first adhesive is greater than acoustic impedances of the lens body and the second electrode, and a thickness of the first adhesive is a half of a wavelength of an acoustic wave in the first adhesive; or the acoustic impedance of the first adhesive is between the acoustic impedance of the lens body and the acoustic impedance of the second electrode, and the thickness of the first adhesive is ¼ of a wavelength of an acoustic wave in the first adhesive.

In some embodiments, the lens body is a convex lens, and an acoustic speed in the convex lens is smaller than an acoustic speed in the filling medium.

In some embodiments, the lens body is a concave lens, and an acoustic speed in the concave lens is greater than an acoustic speed in the filling medium.

In a second aspect, a display device is provided, including a display panel and the fingerprint identification structure according to the first aspect.

In some embodiments, the fingerprint identification structure is on a side of the display panel away from a display surface of the display panel.

DETAILED DESCRIPTION

In order to make those skilled in the art better understand the technical solutions of the present disclosure, the following detailed description is given with reference to the accompanying drawings and the specific embodiments.

Figure 1:
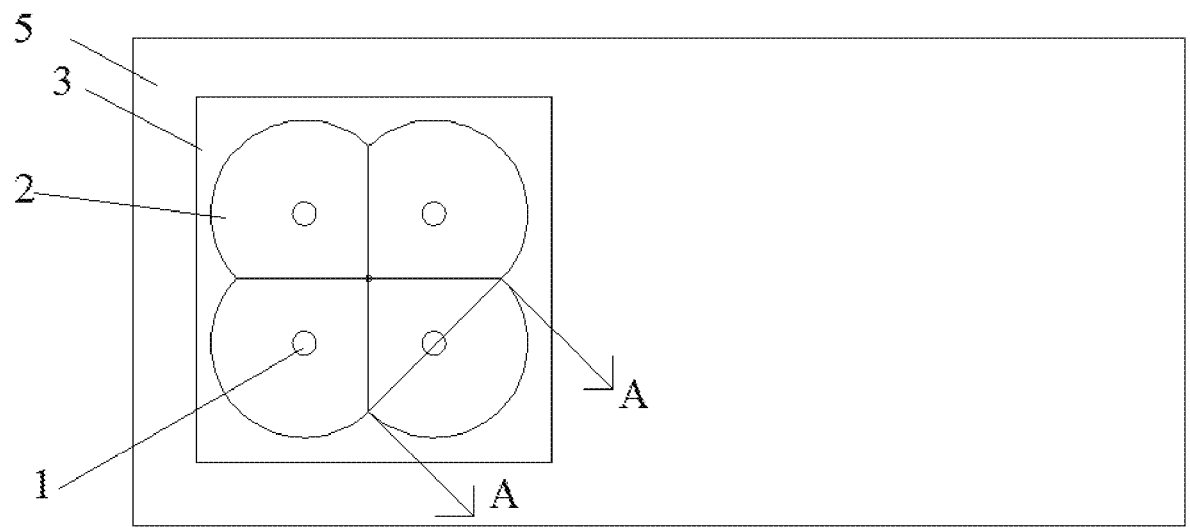
FIG. 1 is an overall layout diagram of a fingerprint identification structure and a display device including the fingerprint identification structure according to an embodiment of the present disclosure.
Figure 2:
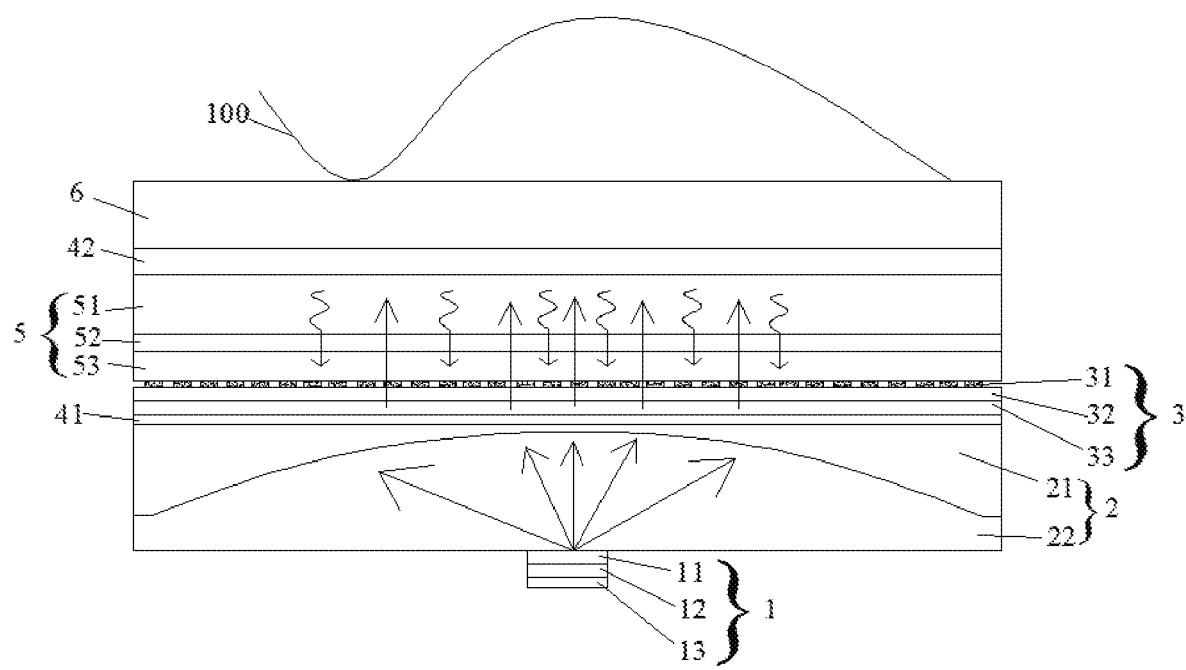
FIG. 2 is a cross-sectional view of the overall layout diagram shown in FIG. 1, taken along line AA, in one embodiment.
Figure 3:
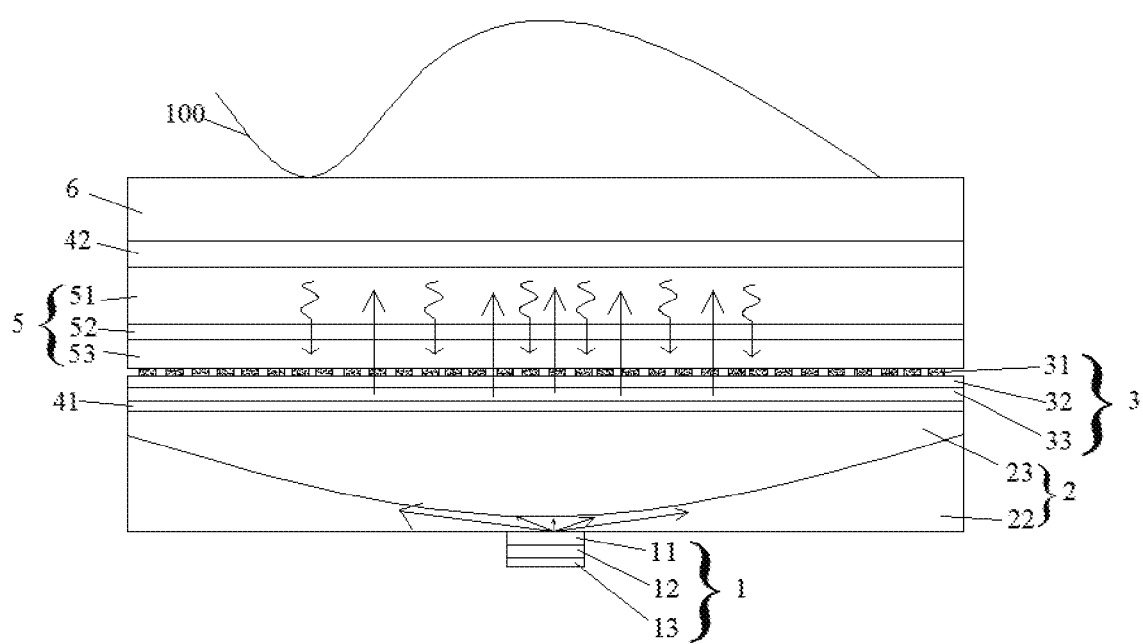
FIG. 3 is a cross-sectional view of the overall layout diagram shown in FIG. 1, taken along line AA, in another embodiment.

Referring to FIGS. 1 to 3, an embodiment of the present disclosure provides a fingerprint identification structure, including: an acoustic lens 2 configured to reduce a divergence angle of acoustic waves; an acoustic wave emitter 1 at a focal position of the acoustic lens 2 and configured to emit acoustic waves toward the acoustic lens 2; and an acoustic wave receiver 3 on a side of the acoustic lens 2 away from the acoustic wave emitter and configured to receive an acoustic wave reflected by a surface of a finger.

The arrows in the figures indicate the direction in which the acoustic wave travels.

The divergence angle of acoustic waves may be defined as an angle formed between two propagation directions with the largest difference among the propagation directions of the acoustic waves.

Referring to FIG. 2, the divergence angle of a portion of the acoustic waves emitted from the acoustic wave emitter 1 and reaching the acoustic lens 2 is an obtuse angle, and the divergence angle of the acoustic waves emitted from the acoustic lens 2 is an angle of approximately 0°.

Since the acoustic wave emitter 1 is disposed at the focal position of the acoustic lens 2, the divergent acoustic waves emitted from the acoustic wave emitter 1 are converted into plane waves after passing through the acoustic lens 2.

A plane wave is an acoustic wave whose wave surface (i.e., the equiphase surface of the wave) is planar when propagating. That is, the phases of the acoustic waves are the same in the plane perpendicular to the travel direction of the acoustic waves. In this way, the phases of the echoes arriving at the acoustic wave receiver 3 are also the same, and thus the acoustic wave receiver 3 can receive the echoes at the same time. The receiving timing of the receiving circuit can be simplified.

The actual acoustic wave emitting region of the acoustic wave emitter 1 necessarily has a certain volume, and locating the acoustic wave emitter 1 at the focal position of the acoustic lens 2 does not strictly limit a specific part of the acoustic wave emitter 1 to be located at the focal position of the acoustic lens 2, and it is only necessary that the focus of the acoustic lens 2 is located in the acoustic wave emitting region of the acoustic wave emitter 1.

Those skilled in the art may adjust the position of the acoustic wave emitter 1 appropriately according to the experimental result to make the acoustic wave obtained after being converted by the acoustic lens closer to a uniform plane wave. For example, it is specified that the distance between the geometric center of the portion of the acoustic wave emitter 1 in contact with the acoustic lens 2 and the focus of the acoustic lens 2 should not exceed 20% of the focal length of the acoustic lens 2.

The acoustic wave as a plane wave passes through the acoustic wave receiver 3, and is finally reflected back by the surface of the finger 100, and the acoustic wave reflected back by the surface of the finger 100 is detected by the acoustic wave receiver 3, so that a processing device (not shown, for example, a fingerprint identification computing chip) externally coupled to the fingerprint identification structure deduces the texture of the fingerprint according to the distribution of the acoustic wave signal.

By taking FIG. 2 as an example, for the peaks of the fingerprint, the interface for reflecting the acoustic wave is the surface of the cover plate 6 in contact with the finger 100, and for the valleys of the fingerprint, the interface for reflecting the acoustic wave is the surface of the cover plate 6 in contact with the air. The two interfaces reflect acoustic waves differently, so that the positions of the peaks and valleys of the fingerprint can be deduced.

Since the emission and reception of the acoustic wave are performed by different components, the selection of the material of the acoustic wave emitter 1 is independent of the selection of the material of the acoustic wave receiver 3. Therefore, a person skilled in the art may select a material with stronger acoustic wave emitting capability to manufacture the acoustic wave emitter 1, and select a material which can be made to have a larger area and has uniform and stable properties to manufacture the acoustic wave receiver 3. In this manner, greater flexibility can be provided for the design of the fingerprint identification structure.

The acoustic wave emitter 1 may be a point acoustic source, and the overall size thereof is as small as possible.

The acoustic wave emitter 1 may include a third electrode 11, a second piezoelectric material layer 12, and a fourth electrode 13 sequentially stacked in a direction away from the acoustic lens 2. The material of the second piezoelectric material layer 12 may be lead zirconate titanate piezoelectric ceramic. The piezoelectric constant of the lead zirconate titanate material is large, usually hundreds of pC/N, for example, 300-500 pC/N, so that the lead zirconate titanate material has strong emission capability. Other materials which can stably emit relatively strong acoustic waves are also preferred.

It should be noted that the piezoelectric material selected for the acoustic wave emitter 1 and the acoustic wave receiver 3 may also be other piezoelectric materials such as AlN, ZnO and the like.

A ratio of a maximum dimension of the second piezoelectric material layer 12 in an extension direction of a plane in which the second piezoelectric material layer 12 is located to a focal length of the acoustic lens 2 is less than or equal to 0.3. Thus, the acoustic wave emitter 1 is closer to an ideal point acoustic source.

The whole acoustic wave emitter 1 shown in FIG. 1 has a circular shape, and the largest dimension thereof is the diameter of the circular shape. Of course, the whole acoustic wave emitter 1 may be rectangular, and the maximum dimension thereof is the length of the diagonal line of the rectangle. It is only required that the whole acoustic wave emitter 1 has a sufficiently small size. That is, assuming that a certain acoustic wave emitting intensity is ensured, the smaller the size of the acoustic wave emitter 1, the better.

The whole acoustic wave receiver 3 is of a planar structure, that is, detects acoustic waves in a relatively large planar region.

An effective receiving area of the acoustic wave receiver 3 should be larger than an effective emitting area of the acoustic wave emitter 1. If the whole acoustic wave receiver 3 is planar, an area of an orthographic projection of the acoustic wave emitter 1 on the plane where the acoustic wave receiver 3 is located should be smaller than the area of the acoustic wave receiver 3.

Referring to FIGS. 2 and 3, the acoustic wave receiver 3 includes a first electrode 31, a first piezoelectric material layer 32 and a second electrode 33, which are stacked.

In some embodiments, the first electrode 31 includes a plurality of first electrode units arranged in an array (i.e., small electrode blocks), and/or the second electrode 33 includes a plurality of second electrode units arranged in an array (i.e., small electrode blocks). That is, the first electrode 31 and the second electrode 33 each may have a whole-surface structure or may be divided into a plurality of electrode units, but at least one of them has an array structure.

Each electrode unit in the array structure may also be coupled to a driving circuit (not shown) for providing a driving voltage to the electrode unit or detecting a voltage on the electrode block.

The design of the driving circuit can be configured according to the related art, which is not limited in the present disclosure.

The size of the electrode unit and the distance between the electrode units in the array structure decide the imaging resolution of fingerprint recognition. For example, the larger the size of the electrode unit, the larger the distance between the electrode units, and the lower the imaging resolution of fingerprint recognition.

For a typical fingerprinting resolution of 500 PPI, the maximum side length of the first or second electrode unit described above (assuming they are rectangular) may be typically between 40 μm and 50 μm. For a typical fingerprinting resolution of 300 PPI, the maximum side length of the first or second electrode unit (assuming they are rectangular) described above may be typically between 65 μm and 75 μm.

Referring to FIGS. 2 and 3, the first electrode 31 includes a plurality of first electrode units arranged in an array, and the second electrode 33 is a whole-surface structure.

In some embodiments, the material of the first piezoelectric material layer 32 may be polyvinylidene fluoride (PVDF), which can be treated by a coating process to fabricate the first piezoelectric material layer 32 with a larger area, and has uniform and stable properties. The piezoelectric coefficient of polyvinylidene fluoride is generally in the range of several tens of pC/N.

In some embodiments, the material of the first electrode 31 may be a metal conductor or an organic conductor, such as copper, silver, molybdenum, alloy materials thereof, and poly (3, 4-ethylenedioxythiophene) (i.e., PEDOT), etc.

In some embodiments, the material of the second electrode 33 may be a metal conductor or an organic conductor, such as copper, silver, molybdenum, alloy materials thereof, and poly (3, 4-ethylenedioxythiophene) (i.e., PEDOT), etc.

In some embodiments, the material of the third electrode 11 may be a metal conductor or an organic conductor, such as copper, silver, molybdenum, alloy materials thereof, and poly (3, 4-ethylenedioxythiophene) (i.e., PEDOT), etc.

In some embodiments, the material of the fourth electrode 13 may be a metal conductor or an organic conductor, such as copper, silver, molybdenum, alloy materials thereof, and poly (3, 4-ethylenedioxythiophene) (i.e., PEDOT), etc.

The detailed structures of two types of acoustic lenses 2 will be described below in conjunction with FIGS. 1-3, and those skilled in the art may also use other types of acoustic lenses 2 to achieve the objectives of the present disclosure.

The acoustic lens 2 includes a lens body 21, 23 and a filing medium 22 on a side of the lens body 21, 23 facing the acoustic wave emitter 1, and a surface of the lens body 21, 23 on a side of the lens body 21, 23 away from the filling medium 22 is planar.

In some embodiments, as shown in FIG. 2, the acoustic lens 2 includes a lens body 21 having a concave lens shape and a filing medium 22 located on a side of the lens body 21 facing the acoustic wave emitter 1, and the acoustic speed in the concave lens 21 is higher than the acoustic speed in the filing medium 22.

The material of the lens body 21 is, for example, polystyrene (the acoustic speed is usually 2400 m/s therein), metal, or glass (the acoustic speed is approximately 6000 m/s therein). The lens body 21 (and the lens body 23 described later) may be fabricated by a molding process. The material of the filing medium 22 is not limited in the present disclosure as long as the acoustic speed therein satisfies the above requirements and the filing medium can be well bonded to the surface of the lens body 21 facing the acoustic wave emitter 1. In this structure, the material of the filling medium 22 is, for example, nylon, polyethylene, polystyrene, rubber, teflon, or the like. For example, according to the present view angle of FIG. 1, the lower surface of the filing medium 22 is planar, and thus is more easily attached and secured to other components structurally. For example, according to the present view angle of FIG. 2, the acoustic wave emitter 1 may be attached to the lower surface of the filling medium 22.

In some embodiments, the second electrode 33 is adhered to the surface of the lens body 21 on the side thereof away from the acoustic wave emitter 1 through the first adhesive 41.

In some embodiments, the acoustic impedance of the first adhesive 41 is greater than the acoustic impedances of the lens body 21 and the second electrode 33, and the thickness of the first adhesive 41 is a half of a wavelength of the acoustic wave in the first adhesive 41. Alternatively, the acoustic impedance of the first adhesive 41 is between the acoustic impedance of the lens body 21 and the acoustic impedance of the second electrode 33, and the thickness of the first adhesive 41 is ¼ of the wavelength of the acoustic wave in the first adhesive 41. On the premise of satisfying the requirement of the acoustic speed above, the material of the first adhesive 41 is selected from existing thermal sensitive adhesives or pressure-sensitive adhesives, which is not limited in the present disclosure. By taking the thermal sensitive adhesive as an example, the thermal sensitive adhesive may be: a water-soluble adhesive, a hot-melt adhesive, a solvent-based adhesive, a emulsion-based adhesive, and a solventless liquid adhesive.

It should be noted that the structure of the acoustic wave receiver 3 is not limited thereto, and various existing devices capable of detecting the distribution of the acoustic wave may be used in the present disclosure. In the specific application environment, the thickness of the first adhesive 41 is configured to reduce the reflection loss of the acoustic wave at the surface of the acoustic wave receiver 3 facing the acoustic lens 2.

Referring to FIG. 3, the acoustic lens 2 includes a lens body 23 having a convex lens shape and a filing medium 22 on a side of the lens body 23 facing the acoustic wave emitter 1, and the acoustic speed in the lens body 23 is less than the acoustic speed in the filling medium 22.

The material of the lens body 23 is, for example, teflon (the acoustic speed therein is 1400 m/s) or polymethyl methacrylate (the acoustic speed therein is 1700 m/s), and the material of the filing medium 22 is not limited in the present disclosure as long as the acoustic speed therein satisfies the above requirements and the filing medium 22 can be well bonded to the surface of the lens body 23 facing the acoustic wave emitter 1. In this structure, the material of the filling medium 22 is, for example, nylon, polyethylene, polystyrene, rubber, or the like. According to the present view angle of FIG. 2, the lower surface of the filing medium 22 is planar, and thus is more easily adhered and secured to other components structurally.

In some embodiments, the acoustic wave receiver 3 includes a first electrode 31, a first piezoelectric material layer 32, and a second electrode 33, which are stacked, the first electrode 31 includes a plurality of first electrode units arranged in an array; the second electrode 33 is adhered to the surface of the lens body 23 on the side thereof away from the acoustic wave emitter 1 through the first adhesive 41; the acoustic impedance of the first adhesive 41 is greater than the acoustic impedances of the lens body 23 and the second electrode 33, and the thickness of the first adhesive 41 is a half of a wavelength of the acoustic wave in the first adhesive 41; alternatively, the acoustic impedance of the first adhesive 41 is between the acoustic impedance of the lens body 23 and the acoustic impedance of the second electrode 33, and the thickness of the first adhesive 41 is ¼ of a wavelength of the acoustic wave in the first adhesive 41.

It should be noted that the structure of the acoustic wave receiver 3 is not limited thereto, and various existing devices capable of detecting the distribution of the acoustic wave may be used in the present disclosure. In this specific application environment, the thickness of the first adhesive 41 is configured to reduce the reflection loss of the acoustic wave at the surface of the acoustic wave receiver 3 facing the acoustic lens 2.

In both embodiments shown in FIGS. 2 and 3, the filling medium 22 has another function of making the acoustic wave emitting surface of the acoustic wave emitter 1 be located just near the focus of the acoustic lens 2, that is, to regulate the distance between the acoustic wave emitter 1 and the center of the acoustic lens 2.

In the embodiment shown in FIG. 2, the curvature radius R of the lens body 21, the focal length L of the lens body 21, the acoustic speed C1 in the filing medium 22, and the acoustic speed C2 in the lens body 21 satisfy the following relationship:

$$L=R/(1-(C1/C2)).$$

For example, the ratio of the acoustic speed C 1 in the filing medium to the acoustic speed C2 in the lens body 21 is 0.5, the curvature radius R of the lens body 21 is 2.5 mm, and the lateral dimension of the lens body 21 can be controlled under 5 mm, but the distance between the highest point of the lens body 21 and the acoustic wave emitter 1 should be kept at 5 mm (which may be realized by controlling the thickness of the filing medium 22).

In the embodiment shown in FIG. 3, the curvature radius r of the lens body 23, the focal length l of the lens body 23, the acoustic speed c1 in the filing medium 22, and the acoustic speed c2 in the lens body 23 satisfy the following relationship:

$$l=r/(1-(c2/c1)).$$

An embodiment of the present disclosure provides a display device, which includes a display panel 5 and a fingerprint identification structure, and the fingerprint identification structure is the fingerprint identification structure described above.

The display panel 5 is, for example, a light emitting diode display panel, and may be an organic light emitting diode display panel, a quantum dot light emitting diode display panel, or the like.

Referring to FIGS. 2 and 3, in some embodiments, the display panel 5 may be an organic light emitting diode display panel, the substrate 53 may be a glass substrate, a plurality of organic light emitting diodes may be disposed in the display function layer 52, and the thin film encapsulation layer 51 may be an organic thin film encapsulation layer or an inorganic thin film encapsulation layer.

In the present disclosure, the specific structure of the display panel 5 is not limited, and may be configured according to the related art.

Referring to FIGS. 2 and 3, in some embodiments, the fingerprint identification structure is located on a side of the display panel 5 away from the display surface of the display panel 5. For example, the display panel 5 is located on a side of the acoustic wave receiver 3 away from the acoustic lens 2, and the display surface of the display panel 5 faces away from the acoustic wave receiver 3. Thus, under screen-based fingerprint identification can be realized.

The acoustic wave receiver 3 may be first fabricated on the display panel 5 by deposition, photolithography, and the like, and then the acoustic wave receiver 3 is adhered to the acoustic lens 2 through the first adhesive 41. Obviously, the fingerprint identification structure may be adhered to the display panel 5 after completing the fabrication of the fingerprint identification structure.

The combination of the display panel and the fingerprint recognition structure is not limited thereto.

Figure 4:
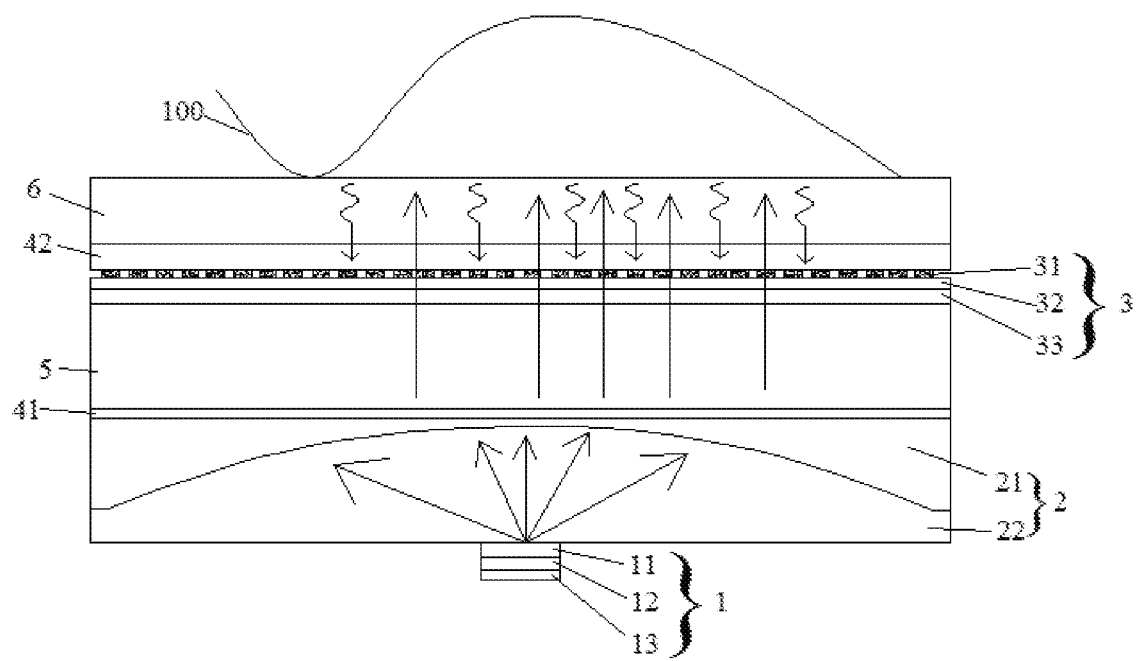
FIG. 4 is a cross-sectional view of the overall layout diagram shown in FIG. 1, taken along line AA, in another embodiment.

For example, in some embodiments, referring to FIG. 4, the display panel 5 may be between the acoustic wave receiver 3 and the acoustic lens 2, with the display surface of the display panel 5 facing the acoustic wave receiver 3.

In this embodiment, the acoustic wave receiver 3 needs to be made of a transparent piezoelectric material, such as polyvinylidene fluoride (PVDF). In addition, the electrodes in the acoustic wave receiver 3 also need to be made of a transparent conductive material, such as indium tin oxide.

In some embodiments, the acoustic wave receiver 3 may also be integrated within the display panel 5, i.e. designed as incell solution.

The display device may further include a cover plate 6 for protecting the display panel 5.

The material of the cover plate 6 is, for example, glass.

Referring to FIGS. 2 and 3, the cover plate 6 is adhered to the display panel 5 by the second adhesive 42.

Referring to FIG. 4, the cover plate 6 is adhered to the acoustic wave receiver 3 by the second adhesive 42.

The second adhesive 42 may be optical adhesive (OC).

Referring to FIG. 1, since a single fingerprint recognition structure has a limited fingerprint recognition area, a plurality of fingerprint recognition structures may be adhered to one display panel 5. For example, the surface of the acoustic wave emitter 1 is in the shape of a circle with a diameter of 1 mm, and a plane wave with a diameter of 5 mm is obtained through conversion by the acoustic lens 2. If a fingerprint identification area with a diameter of 2 cm is required, 4 to 6 fingerprint identification structures are required.

The whole acoustic lens 2 is generally circular in shape. Since a plurality of acoustic lenses 2 need to be spliced together, the adjacent surfaces thereof may be cut to be flat, thereby facilitating splicing of the plurality of acoustic lenses 2.

In order to prevent the plurality of acoustic wave emitters 1 from interfering with each other, the plurality of acoustic wave emitters 1 may be sequentially operated, so that the corresponding detection regions of the acoustic wave receivers 3 sequentially perform detection.

In some embodiments, the display device is any product or component having a display function, such as a display module, a mobile phone, a computer, a display, and the like.

An embodiment of the present disclosure further provides a driving method of a fingerprint identification structure, which is applied to the fingerprint identification structure described above. By taking the fingerprint identification structure shown in FIG. 2 or FIG. 3 as an example, the driving method includes: driving the acoustic wave emitter 1 to emit an acoustic wave; and detecting the acoustic wave reflected by the finger and received by the acoustic wave receiver 3. By taking FIG. 1 as an example, the above process is repeated 4 times, so as to detect the characteristics of the fingerprint in the detection regions corresponding to four acoustic wave emitters 1.

It will be understood that the above embodiments are merely exemplary embodiments employed to illustrate the principles of the present disclosure, and the present disclosure is not limited thereto. It will be apparent to those skilled in the art that various changes and modifications can be made therein without departing from the spirit and scope of the disclosure, and these changes and modifications are to be considered within the scope of the disclosure.

What is claimed is:

1. A fingerprint identification structure, comprising:
an acoustic lens configured to reduce a divergence angle of acoustic waves;
an acoustic wave emitter at a focal position of the acoustic lens and configured to emit acoustic waves toward the acoustic lens; and
an acoustic wave receiver on a side of the acoustic lens away from the acoustic wave emitter and configured to receive acoustic waves reflected by a surface of a finger,
wherein the acoustic lens comprises a lens body and a filing medium on a side of the lens body facing the acoustic wave emitter, and a surface of the lens body on a side of the lens body away from the filing medium is a flat surface.

2. The fingerprint identification structure of claim 1, wherein the acoustic wave emitter is a point acoustic source.

3. The fingerprint identification structure of claim 2, wherein the point acoustic source comprises a third electrode, a second piezoelectric material layer, and a fourth electrode sequentially stacked in a direction away from the acoustic lens.

4. The fingerprint identification structure of claim 3, wherein a material of the second piezoelectric material layer is a lead zirconate titanate piezoelectric ceramic.

5. The fingerprint identification structure of claim 3, wherein a ratio of a maximum dimension of the second piezoelectric material layer in an extension direction of a plane in which the second piezoelectric material layer is located to a focal length of the acoustic lens is less than or equal to 0.3.

6. The fingerprint identification structure of claim 1, wherein the acoustic wave receiver comprises a first electrode, a first piezoelectric material layer, and a second electrode sequentially stacked in a direction toward the acoustic lens.

7. The fingerprint identification structure of claim 6, wherein the first electrode comprises a plurality of first electrode units arranged in an array; and/or the second electrode comprises a plurality of second electrode units arranged in an array; and the first piezoelectric material layer has a planar structure.

8. The fingerprint identification structure of claim 7, wherein a material of the first piezoelectric material layer comprises polyvinylidene fluoride.

9. The fingerprint identification structure of claim 1, wherein the second electrode is adhered to a surface of the lens body on a side of the lens body away from the acoustic wave emitter through a first adhesive.

10. The fingerprint identification structure of claim 9, wherein an acoustic impedance of the first adhesive is greater than acoustic impedances of the lens body and the second electrode, and a thickness of the first adhesive is a half of a wavelength of an acoustic wave in the first adhesive; or
the acoustic impedance of the first adhesive is between the acoustic impedance of the lens body and the acoustic impedance of the second electrode, and the thickness of the first adhesive is ¼ of a wavelength of an acoustic wave in the first adhesive.

11. The fingerprint identification structure of claim 1, wherein the lens body is a convex lens, and an acoustic speed in the convex lens is smaller than an acoustic speed in the filling medium.

12. The fingerprint identification structure of claim 1, wherein the lens body is a concave lens, and an acoustic speed in the concave lens is greater than an acoustic speed in the filling medium.

13. A display device, comprising a display panel and the fingerprint identification structure of claim 1.

14. The display device of claim 13, wherein the fingerprint identification structure is on a side of the display panel away from a display surface of the display panel.

* * * * *